March 23, 1965 D. N. MacDONALD 3,175,204

MAGNETIC CARD RANDOM ACCESS MEMORY

Filed Aug. 22, 1960 6 Sheets-Sheet 1

INVENTOR.
DUNCAN N. MacDONALD
BY
Christie, Parker & Hale
ATTORNEYS

March 23, 1965 D. N. MacDONALD 3,175,204

MAGNETIC CARD RANDOM ACCESS MEMORY

Filed Aug. 22, 1960 6 Sheets-Sheet 2

INVENTOR.

DUNCAN N. MACDONALD

BY

Christie, Parker & Hale

ATTORNEYS

March 23, 1965 D. N. MacDONALD 3,175,204

MAGNETIC CARD RANDOM ACCESS MEMORY

Filed Aug. 22, 1960 6 Sheets-Sheet 3

INVENTOR.
DUNCAN N. MACDONALD
BY
Christie, Parker & Hale
ATTORNEYS

INVENTOR.
DUNCAN N. MACDONALD
BY Christie, Parker & Hale
ATTORNEYS

INVENTOR.
DUNCAN N. MACDONALD
BY
Christie, Parker & Hale
ATTORNEYS

United States Patent Office 3,175,204

Patented Mar. 23, 1965

3,175,204

MAGNETIC CARD RANDOM ACCESS MEMORY

Duncan N. MacDonald, Arcadia, Calif., assignor to Burroughs Corporation, Detroit, Mich., a corporation of Michigan

Filed Aug. 22, 1960, Ser. No. 51,039

2 Claims. (Cl. 340—174.1)

This invention relates to a magnetic information storage device and, more particularly, is concerned with a random access file in which a plurality of cards, having information stored magnetically thereon, is individually selected.

With the advent of electronic data processing equipment, the need has arisen for a memory apparatus for storing large amounts of data in readily accessible form. A number of well known memory devices have heretofore been devised such as the delay line and the magnetic drum, both of which are limited in their capacity and put out information only in a fixed predetermined sequence. The coincidence core memory has the advantage that it is a random access memory, i.e., any piece of stored information is equally as accessible as any other piece of stored information, but it is costly and of too limited capacity for bulk storage of data. Magnetic tape has been used for storing large amounts of information but has the disadvantage that information can only be read out in a predetermined sequence off the tape and the time for addressing and reading out any particular piece of information is slow.

The present invention provides an improved digital storage system which provides random access to a large amount of data yet has an access time which is much less than magnetic tape or other bulk storage systems. The present invention is in the form of an automatic file in which information is stored on separate cards in the file. Any card can be selected from the file automatically in response to a coded input signal. A plurality of magnetic tracks on each card can be individually selected and digital information recorded on or read off the card automatically from any selected track. Thus random access is provided to any selected card and track.

In brief, the random access memory of the present invention includes a plurality of small file cards, each of which is provided with a plurality of parallel magnetic strips on which may be recorded binary information bits. The cards are arranged in a horizontal stack. By means of a series of undercut slots along the top edge of each of the cards, the cards are supported by a plurality of bails extending through the slots. The arrangement of the undercut slots and the positioning of the bails is such that all the cards but one are supported by the bails, permitting the one unsupported card to drop out of the stack. This card is vertically positioned such that transducer means selectively scans one of the magnetic strips on the dropped card to read out the selected information.

For a more complete understanding of the invention, reference should be made to the accompanying drawings, wherein.

Figure 1:
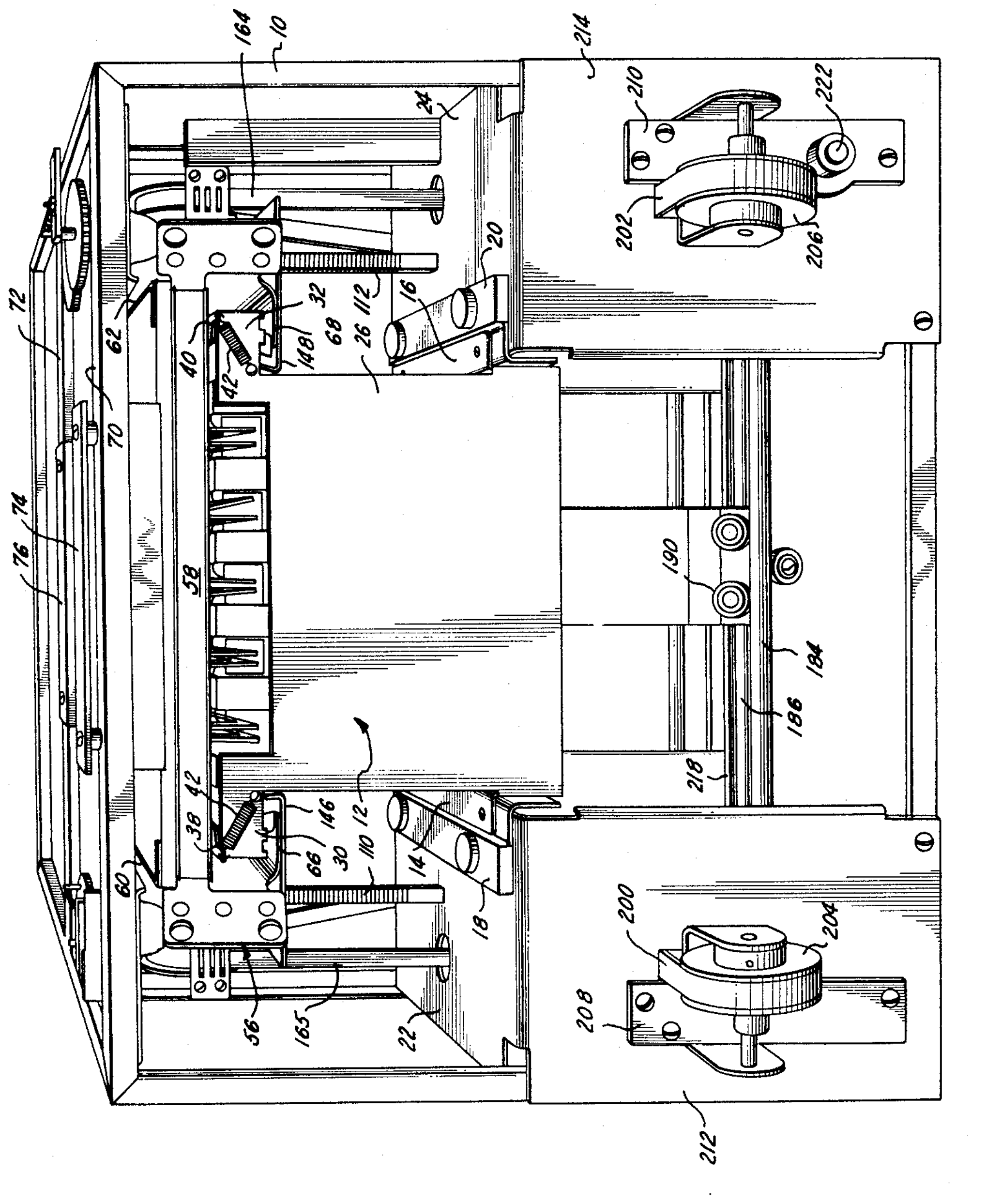
FIGURE 1 is a perspective view from the front.

Referring to the drawings in detail, the numeral 10 indicates generally an outer rectangular framework of the machine. Removably supported within the frame 10 of the machine is a card magazine assembly indicated generally at 12. The magazine assembly 12 includes a pair of horizontal support plates 14 and 16 located on either side which slidably engage a pair of horizontal track members 18 and 20 carried on frame plates 22 and 24 that are rigidly secured to the outer frame 10. The frame plates 22 and 24 are located substantially half way between the top and bottom of the frame 10. The card magazine assembly 12 slides as a unit on the tracks 18 and 20 when it is inserted into the card selecting machine. Thus a whole magazine of cards may be conveniently replaced in the machine.

Figure 2:
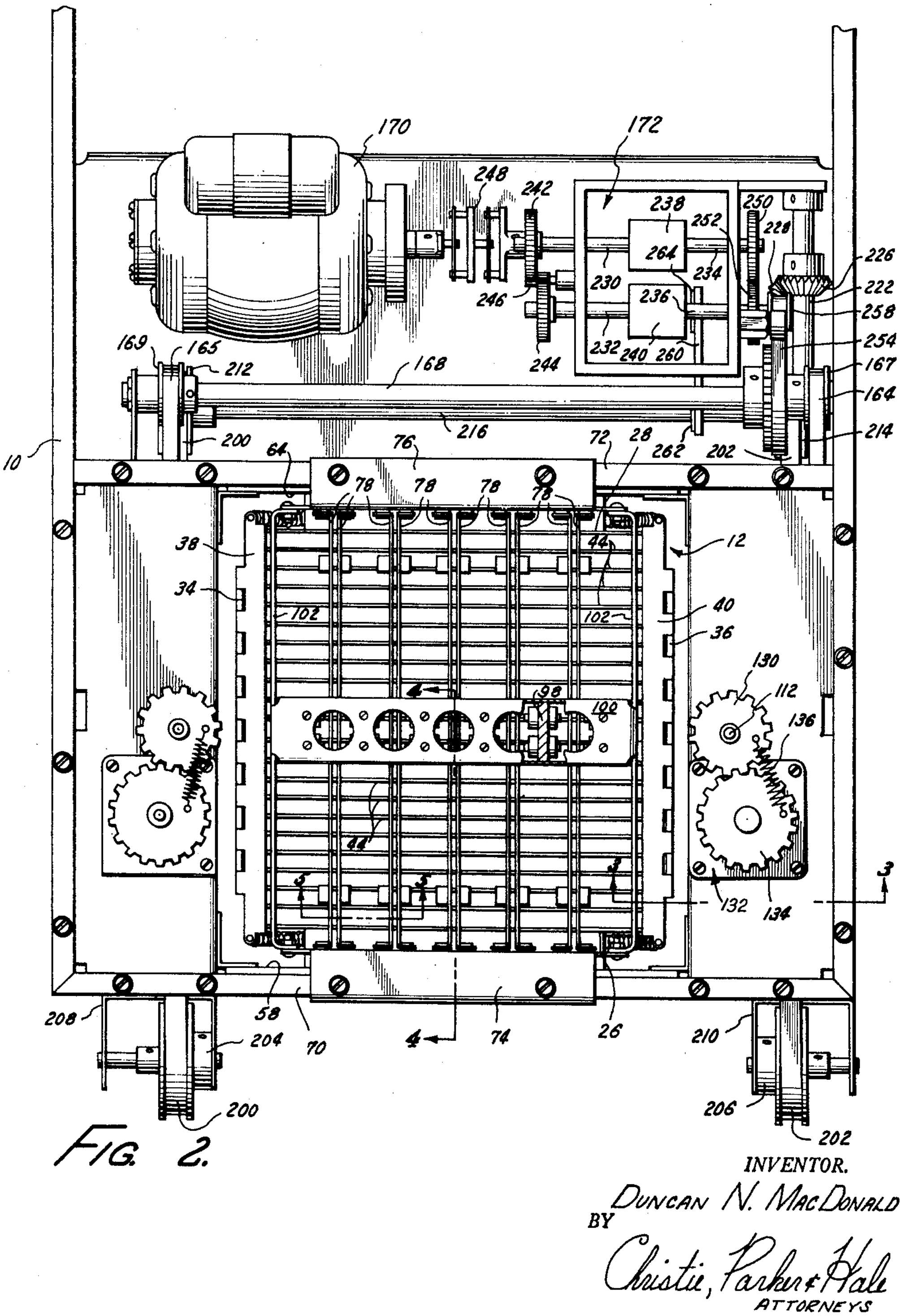
FIGURE 2 is a top view.

The magazine assembly includes a front plate 26 and a back plate 28, as seen in FIGURE 2. The support plates 14 and 16 form part of the magazine frame extending between the front plate 26 and the back plate 28. The magazine is wider at the top as formed by the projecting portions 30 and 32 of the front plate 26. (See FIGURE 1). Back plate 28 has similar projecting portions at the top. Connecting side plates 34 and 36 join the front and back plates 26 and 28 of the magazine assembly 12, the side plates extending respectively between the projecting portions 30 and projecting portions 32 of the front and back plates. The side plates 34 and 36 have card retainer members 38 and 40 hinged thereto. Springs 42 at the end of the retainer plates 38 and 40 normally hold the retainer plates in the positions shown, but permit the plates to be held out of position so that cards can be replaced in the magazine.

Figure 3:
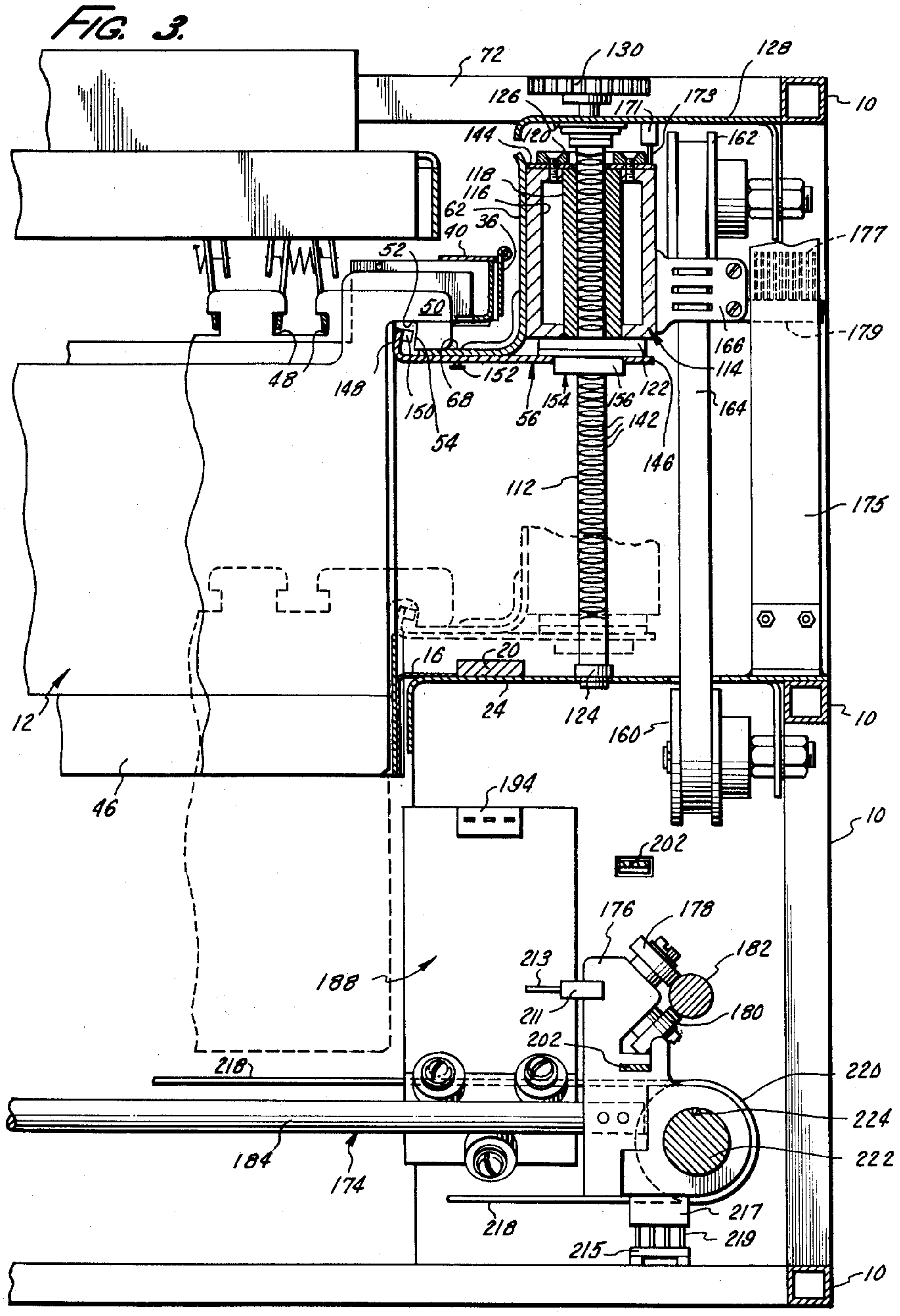
FIGURE 3 is a partial sectional view showing the lowered position of a card in dish lines.

The magazine assembly 12 also includes a plurality of partition plates 44 which are evenly spaced between and parallel to the end plates 26 and 28. A group of plastic cards is inserted in each of the compartments formed by the partitions 44. Each card, one of which is indicated at 46 in FIGURE 3, is substantially rectangular in shape and is initially provided with five notches along the upper edge, the notches being undercut on both edges as indicated at 48. In addition, the upper corners of each card are provided with laterally projecting portions 50. These projecting portions are notched out along the lower edges, as indicated at 52, to provide a slanting undercut edge 54 which is used to securely lock a selected card, in manner hereinafter described.

When the magazine 12 is in position in the machine, the laterally projecting portions 50 of the cards stored in the magazine overlie a vertically movable supporting frame indicated generally at 56. The frame 56 is of an open rectangular shape including a front member 58, side members 60 and 62 and rear member 64. The frame 56 is shown in its normal upper position and is movable downwardly to any of a number of lower vertical positions by means hereinafter described in detail. The frame 56 with its rectangular opening extends around the card magazine 12 when the magazine is loaded in position in the supporting frame.

The frame 56 includes a pair of parallel card supporting plates 66 and 68 which extend along the lower edge of the side members 60 and 62. The card supporting plates project inwardly towards the magazine so as to underlie the projecting portions 30 and 32 of the magazine as well as the undercut projections 50 of the card, as best shown in FIGURE 3. After the magazine 12 is in position, the cards are all supported on the support plates 66 and 68 of the vertically movable frame 56. The cards, unless otherwise constrained, move up and down with the vertical movement of the frame 56 within the compartments of the magazine 12. As the vertical frame 56 is lowered, any card not otherwise supported is lowered through the bottom of the magazine 12. In actual operation by means hereinafter described, only one card is permitted to drop with the lowering of the frame 56, all the other cards being constrained in the following manner.

Figure 4:
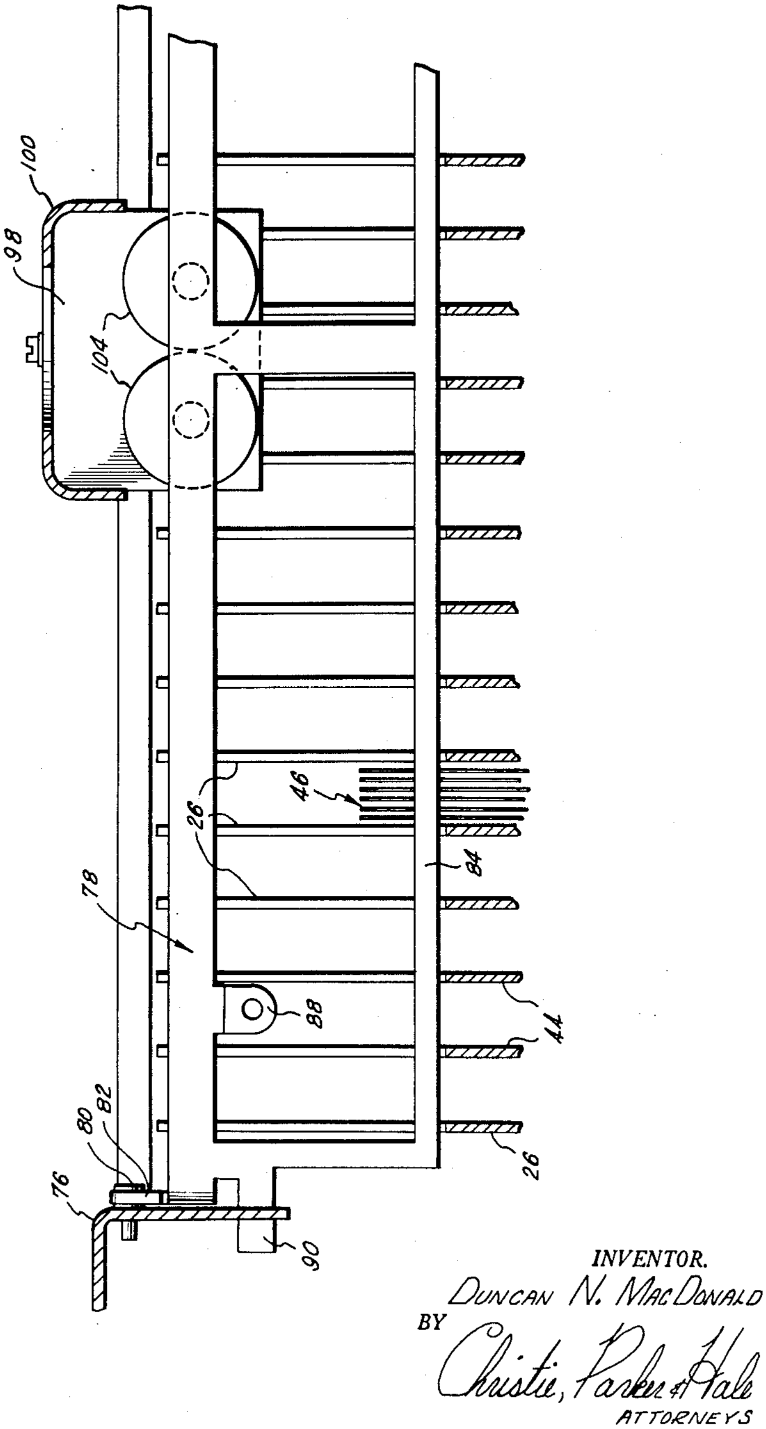
FIGURE 4 is a partial sectional view taken on the line 4—4 of FIGURE 2.

Referring to FIGURE 2, the frame 10 includes two parallel top frame portions 70 and 72 to which are secured a pair of angle members indicated at 74 and 76 respectively. These angle members provide spaced vertical surfaces which are positioned above and to either side of the end plates 26 and 28 of the magazine 12. Pivotally supported between the vertical faces of the angle members 74 and 76 are five pairs of bails 78. As best shown in FIGURE 4, each of the bails 78 is in the form of an elongated rectangular frame pivotally supported by pins 80 passing through support bracket portions 82 integrally formed at the upper corners of the bails 78.

Figure 5:
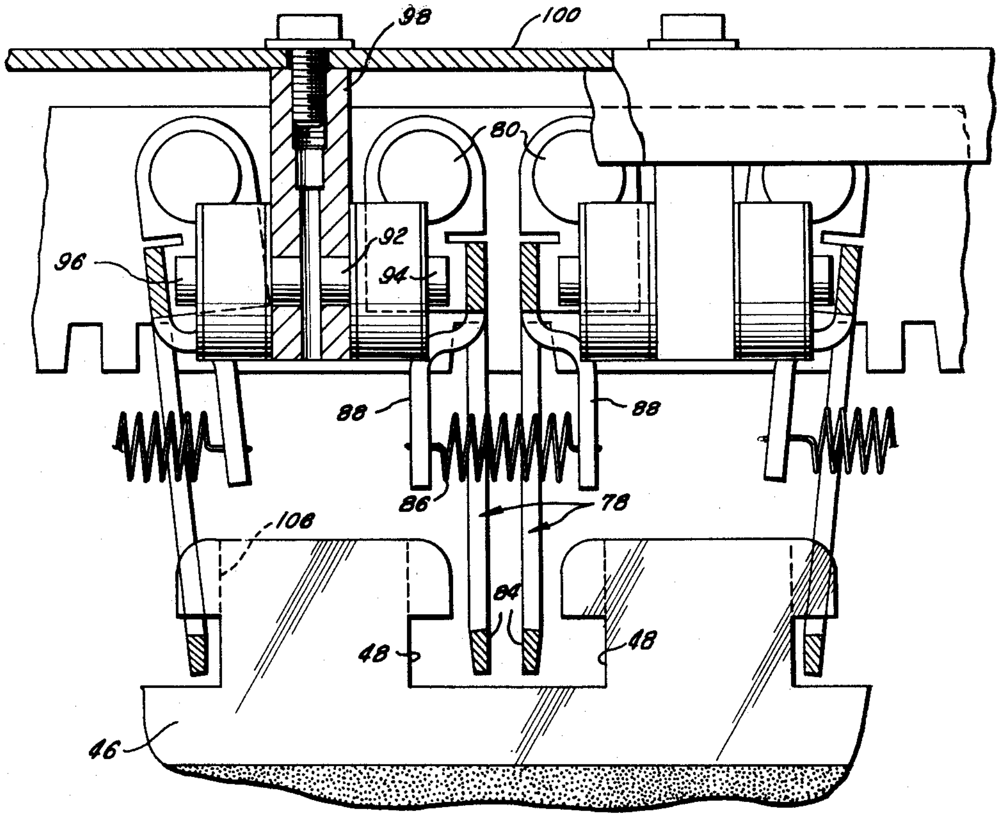
FIGURE 5 is a partial detailed sectional view showing the card supporting bails.

A lower horizontal portion 84 of the bail frame 78 is arranged to lie in one of the slots of the cards in the magazine, there being one pair of bails for each slot in the cards, as best seen in the sectional view of FIGURE 5. The pair of bails 78 associated with one card slot are normally urged together to a position substantially in the center of the slot by a tension spring 86 which is attached to arms 88 that are integrally formed as part of the bail frame 78. A tab 90 projects from one end of the bail frame 78 and engages a notch in the angle member 76 to provide a stop against which the bail frames 78 are held by the tension of the spring 86.

Each of the bail frames 78 may be selectively pivoted against the tension of its associated spring 86 and off the stop provided by the tab 90 by a pair of electromagnets. The pivoting of the bail moves the lower horizontal portion 84 into engagement with the undercut portion 48 of the associated notch in the card 46. The electromagnets include a magnetic core, such as indicated at 92, forming a pair of pole faces 94 and 96 respectively adjacent portions of two of the bail frames 78. The core 92 is supported at its center by a supporting block 98 which is secured to the bottom surface of a channel frame member 100. As shown in FIGURE 2, the channel frame member 100 extends transversely to and above the bail frames 78 and is supported at either end by brackets 102 which are secured to the angle members 74 and 76. Solenoid coils 104 are positioned on each of the pole members 92 on either side of the support block 98. Energizing of the pair of solenoid coils on one side of the supporting block 98 actuates the associated bail frame 78, moving the lower horizontal portion 84 into the undercut part of the notched cards. When a bail engages the undercut portion 48 of the notch in a particular card, that card is constrained against vertical downward movement.

The undercut portion of a particular card may be removed by cutting off the projecting tab on the edge of the notch in the card on the dotted line indicated at 106. The bail then cannot provide vertical support for that card. It is possible by simple coding to provide each card with a different combination of removed tabs forming the undercut portions of the notches, such that for a particular combination of actuated and unactuated bails, one and only one of the plurality of cards remains unsupported by at least one of the bails. Thus when the frame 56 is lowered vertically, all but one of the cards remains supported by the bails, the unsupported card dropping vertically downward with the movement of the frame 56 so as to project below the bottom of the magazine 12 where it can be individually scanned for information. One suitable code is a standard two-out-of-five code, the ten bails being divided in two groups corresponding to the two digits representing each of one hundred cards. Four bails are actuated for each selection and only the one card out of a hundred having all corresponding four of the notch tabs removed will drop.

Preferably the cards are loosely packed with ten cards to a compartment. It may even be desirable to provide spacers between adjacent cards to permit them to slide past each other more easily. The surfaces of each card are provided with a coating of magnetic material suitable for magnetic recording in the same manner as well known magnetic tape.

The frame 56 is arranged to be moved vertically to any one of a plurality of possible vertical positions and locked in the selected vertical position while the card is scanned by a magnetic head to read out or record on the magnetic coating on the card. To this end, the frame 56 is journalled for vertical movement along a pair of rectangular guide rods 110 and 112 located on either side of the card magazine 12, as in FIGURE 1. Vertical positioning of the frame 56 in relation to the guide rod 112 is provided by a lane select mechanism, indicated generally at 114. (See FIGURE 3.) The lane select mechanism includes a hollow block 116 having openings at the top and bottom through which the guide rod 112 passes. Block 116 is rigidly secured to the frame 56. A sleeve 118 having a rectangular opening slidably engages the guide rod 112. The sleeve 118 passes through the openings in the upper and lower portions of the block 116 and is held in position by an upper anchor plate 120 and a lower anchor plate 122 which are secured to the ends of the block 116. The rod 112 is rotatably supported at its lower end in a bushing 124 which engages the frame plate 24. The upper end of the rod 112 is journalled in a bushing 126 supported by an upper frame plate 128 which is secured to the frame 10. The upper end of the guide rod 112 passes through the frame plate 128 and is provided with a spur gear 130.

As best seen in FIGURE 2, rotation is imparted to the guide rod 112 by a rotary solenoid device indicated generally at 132 which drives a spur gear 134, the gear 134 engaging the gear 130. The rotary solenoid 132, when energized, imparts a 45 degree rotation to the guide rod 112. A spring 136 is secured at one end to spur gear 130 and at the other end to the spur gear 134 in such a manner as to oppose the action of the solenoid.

When the guide rod 112 is rotated by the rotary solenoid 132, it accomplishes two things. First, it positively locks the frame 56 in whatever vertical position it is in at the time the guide rod 112 is rotated. This is accomplished by a series of circular grooves 142 which are cut in the square guide rod 112. When the guide rod 112 is rotated through 45 degrees, one of these grooves engages a locking plate 144 secured to the top of the block 116 and held in place by the angular ring 120. The plate 144 has a square opening through which the rod 112 passes. The rotation of the rod 112 to a 45° position causes the plate 144 to engage one of the slots in the rod 112, thereby positively locking the frame 56 in vertical position. Similar action is achieved by identical locking means associated with the rod 110 on the opposite side of the magazine 12.

Second, rotation of the rod 112 provides a positive locking of the selected card 46. This is accomplished by a locking plate 146 which has a turned up edge 148 that extends the full depth of the card magazine 12. The turned up edge has a rubber strip 150 extending its full length which is in position to engage the undercut edge 54 of the selected card. Clamping plate 146 is supported for limited lateral movement from the frame 56 by retainer pins 152. The clamping plate 146 has an opening which is engaged by a cam member 154. The cam member has a square opening which is engaged by the rod 112 and a circular shoulder 156 which is eccentric with relation to the axis of rotation of the rod 112. Rotation of the cam member 154 by the guide rod 112 thus produces a lateral movement of the plate 146, moving the rubber piece 150 into clamping engagement with the undercut edge of the card. At the same time, a similar clamping plate 146 on the opposite side of the magazine 12 clamps the other end of the card through rotation of the rod 110, securing the card against lateral or vertical movement when the selected card has dropped to its desired level.

Vertical movement is imparted to the frame 56 by a belt drive arrangement which includes a pulley 160 rotatably supported from the frame below the frame plate 24 and a pulley 162 rotatably supported from the frame below the upper frame plate 128. See FIGURE 3. A portion of a belt 164 extends vertically between the pulley 160 and 162. A clamp fitting 166 mounted on the block 116 imparts movement to the frame 56 in response to movement of the belt 164 over the pulleys. A similar belt 165 and pulley arrangement is provided on the opposite side of the card magazine 12.

As shown in FIGURE 2, the belts 164 and 165 pass over drive pulleys 167 and 169 carried on a pulley shaft 168 rotatably supported from the frame 10 in the region behind and slightly below the position of the card magazine. The shaft 168 can be rotated in either direction from a drive motor 170 through a gear and clutch drive assembly indicated generally at 172. The assembly 172 will be described hereinafter in more detail, but generally is arranged to impart rotation in one direction or another to the shaft 168 in response to selective energizing of two associated electromagnetic clutches.

A switch 171 mounted at the top of frame 10 as seen in FIGURE 3 has an actuating arm 173 that is engaged by the block 116 when the frame 56 is in its uppermost position. This switch is used in the control circuitry hereinafter described to indicate the frame 56 is in its "home" position. An analog-to-digital resolver 175, in the form of an insulating card with a pattern of contacts, is mounted vertically along the belt 164, as seen in FIGURE 3. A plurality of brushes 177 carried by an insulating block 179, secured to the clamp fitting 166, scan the contacts as the frame 56 moves vertically. The action of the resolver is described in more detail in connection with the control circuit of FIGURE 7.

Once the proper card has been selected by the setting of the bails, and the proper lane on the card has been selected by vertical positioning of the frame 56 and associated locking mechanism, the card is scanned by a magnetic head for recording on or reading from the magnetic surface of the card. To this end, a bridge assembly indicated generally at 174, extends below the region in which the selected card is lowered and is movable to a position below the selected card. The bridge assembly 174 includes a cast block 176 having two pairs of rollers 178 and 180 secured thereto at substantially right angles to each other, which engage a guide rod 182. The rod 182 is securely held at its two ends to portions of the frame 10. The bridge assembly 174 includes a pair of horizontal spanning rods 184 and 186 which extend between the block 176, as shown in FIGURE 3, to a corresponding block (not shown) on the other side of the machine, which similarly is guided by a corresponding guide rod parallel to the guide rod 182.

Figure 6:
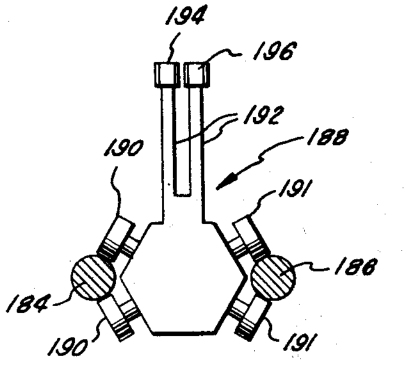
FIGURE 6 is a partial view showing the transducer carriage.

A carriage assembly, indicated generally at 188, is arranged to move transversely along the rods 184 and 186. See FIGURE 6. The carriage assembly includes two pairs of rollers 190 and 191, each pair of rollers engaging one of the spanning rods 184 and 186, the rollers being arranged at an angle with respect to each other so as to provide vertical as well as lateral guidance. The carriage assembly includes a pair of spaced parallel plates 192 which are relatively thin so as to be easily deflected. A pair of magnetic heads are mounted at the top of the plates 192, as indicated at 194 and 196 respectively. The heads are chamfered at the edges to guide the card into the center of the space between them as the carriage moves into engagement with the selected card. The card deflects the plates 192 apart sufficiently to permit the card to pass between the heads.

Positioning of the bridge 174 along the tracks 182 is accomplished by a pair of drive belts 200 and 202. These belts pass over pulleys 204 and 206 respectively which are journalled for rotation on suitable brackets 208 and 210 mounted on frame plates 212 and 214 respectively on the front of the machine.

The belts 200 and 202 respectively pass over pulleys 212 and 214 mounted on a shaft 216, rotatably supported on the back part of the frame 10. See FIGURE 2. Each of the belts is secured at one point to the bridge 174, as shown in FIGURE 3. Thus the rotation of the shaft 216 moves the bridge, through the belts, along the guide member 182. Shaft 216 is rotated in either direction by the motor 170 through the drive assembly 172 in a manner hereinafter more fully described.

An analog-to-digital resolver 215, in the form of an insulating card with a pattern of contacts, is mounted horizontally from the frame 10 below the bottom of the block 176. An insulating block 217 having a plurality of contact fingers 219 is mounted on the bottom of the block 176. The fingers 219 scan the contacts on the resolver 215 as the bridge moves along the guide 182. The resolver provides a digital representation of the bridge position.

Scanning movement is imparted to the carriage by a belt 218 which passes over pulleys journalled in the bridge blocks at either end of the spanning guide rods 184 and 186. The righthand pulley is indicated at 220 in FIGURE 3. In the case of the righthand pulley 220, a shaft 222, having a key slot 224, passes through the bridge block 176 and through the pulley 220. Shaft 222 is journalled at one end in the frame plate 214 and at the other end in a support bracket 224 at the rear of the main frame 10. Rotation is imparted to the key shaft 222 from the motor 170 through the transmission assembly 172 and mitered gears 226 and 228. Thus rotation of the shaft 222 rotates the pulley 220 in one or the other of two directions, causing the carriage 188 to be scanned back and forth on the bridge rods 184 and 186 by means of the belt 210. By means of the transmission drive 172 and associated control circuitry, the magnetic heads 194 and 196 can be positioned substantially in line with the vertical edge of any selected card which is dropped from the card magazine. The heads 194 and 196 can then be caused to scan across the card for reading out a recording on the magnetic surface on both sides of the card.

Limit switches are mounted on both bridge blocks, such as the switch 211 mounted on block 176 having an actuating arm 213. The limit switches are actuated by the head carriage at the limits of its travel on the bridge. These switches are described functionally as part of the control circuit of FIGURE 7.

The transmission 172 includes three pairs of input shafts, one pair of which includes the input shafts 230 and 232. There are also three pairs of output shafts, one pair of which is indicated at 234 and 236. Each of the input shafts is coupled to a corresponding output shaft by an electromagnetic clutch, such as indicated at 238 and 240. Three of the input shafts, one from each pair, are coupled together by meshing spur gears on each of the three shafts, as indicated at 242. The other three input shafts are similarly linked by meshing spur gears 244. A pinion gear 246 engages one of the spur gears 242 and one of the spur gears 244. The motor 170 is coupled by a flexible coupling 248 to one of the input shafts. Thus it will be seen that each pair of input shafts, such as the shaft 230 and the shaft 232, are rotated in the same direction by the motor 170.

Each pair of output shafts, such as the shafts 234 and 236, are coupled by a pair of meshing spur gears 250 and 252. Thus the output shafts in a pair are caused to rotate in opposite directions. By energizing one or the other of the two clutches associated with each pair of shafts, such as the clutch 230 or the clutch 240, the output shafts in a pair can be made to rotate in one direction or the other.

One pair of output shafts 234 and 236 are coupled to the shaft 168 by means of a belt drive 254 which passes over a pulley 256 carried by the shaft 168 and over a pulley 258 carried by the shaft 236. Thus energizing of the electromagnetic clutch 230 imparts vertical motion in one direction to the frame 56 by the belt 164, whereas energizing of the electromagnetic clutch 240 imparts vertical motion in the opposite direction to the frame 56. Similarly the shaft 216 is coupled by a belt 260 to a pulley 262 on the shaft 216 and a pulley 264 on one of the output shafts of the transmission 172.

The bevel gear 228 is coupled to a third one of the output shafts such that energizing of one or the other of two electromagnetic clutches produces opposite directions of rotation of the key shaft 222 to impart scanning movement to the carriage 188.

From the above description, it will be recognized that a mechanism is provided by means of which one of a large number of cards may be dropped from a card loaded magazine. The card may be dropped a selected amount and each surface of the card scanned by a magnetic head. The vertical position of the selected card determines which lane out of a plurality of lanes across the card are selected for magnetic recording or magnetic readout by the transducer head.

Figure 7:
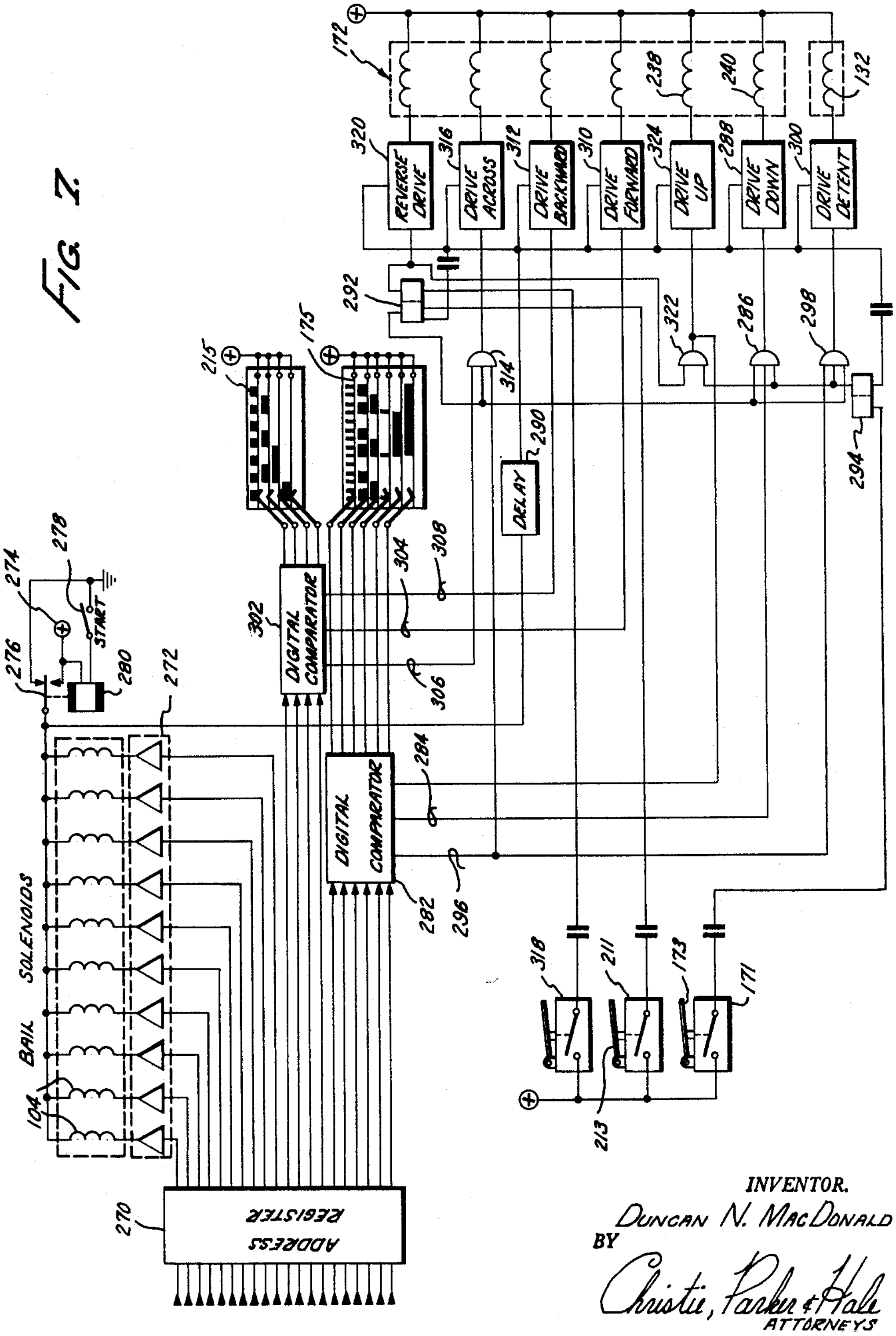
FIGURE 7 is a schematic diagram of the control circuit.

By means of the circuit such as shown in FIGURE 7, a selected line on a card can be addressed for recording or reading out information. This is accomplished by storing a digitally coded address in a register 270. The address may be derived in a conventional manner from a computer or other data processing equipment with which the card memory is used. The address identifies the particular card, the compartment in which the card is stored, and the track on the card from which information is to be read. The address is stored in suitable binary coded form by which a pattern of high and low voltage levels is provided on a plurality of output lines.

One group of ten output lines goes to a group of drivers 272 for respectively driving each of the bail-actuating solenoids 104. The drive circuit is completed through the bail solenoids from a positive potential source 274 by means of a relay-operated switch 276. When it is desired to select a card, a start switch 278 is closed, energizing the relay coil 280 and closing the switch 276. Those solenoid coils are actuated in which the register provides a high level input to the corresponding driver. Thus a pattern of bail solenoids are energized, the bails supporting all the cards except one according to the coding of the notches in the manner described above.

To lower the selected card to the proper position for reading out the selected track on the card, the address of the track, as derived from the register 270, is applied to a digital comparator circuit 282. A pattern of voltage levels is also applied to the digital comparator as derived from the resolver 175. The digital comparator circuit 282 compares the pattern of voltage levels on the two groups of inputs and provides a high level voltage on one of three output lines depending upon whether the value of the address is greater, equal to or less than the digital value of the indication derived from the resolver 175. Digital comparator circuits of this type are well known in the digital computer art by which two binary coded numbers are compared and a high, low, or equal indication provided.

If the digital representation of the address is greater than that of the resolver, which is always true when the card positioning frame 56 is in its uppermost or "home" position, the digital comparator produces a high level on the output line 284. This high level is used to initiate a downward movement of the frame 56 by energizing the appropriate electromagnetic clutch 240 in the drive assembly 172. To this end, the output line 284 is applied to an *and* gate 286, the output of which is applied to a "drive down" amplifier 288 for actuating the electromagnetic clutch 240 to produce a downward movement of the frame 56. "Drive down" amplifier 288 as well as all other clutch drive amplifiers are normally biased off until the actuation of the relay 280 on the closing of the start switch 278. A delay circuit 290 is provided to delay the biasing on of the drive amplifiers until after the bail solenoids have been energized and the bails properly positioned.

The *and* gate 286 is connected to one side of a bistable multivibrator 292 and to one side of a bistable multivibrator 294. Both the multivibrator 292 and the multivibrator 294 are set by the closing of the start switch 278 in condition to provide a high level input to the *and* gate 286. Thus the down drive is initiated at a delayed interval following the closing of the switch 278.

When the frame 56 moves down to a position where the digital value produced by the resolver 178 matches that of the address, the digital comparator produces a high level on the output line 296. This is connected to an *and* gate 298 which is also connected to the multivibrators 292 and 294. Thus the output of the *and* gate 298 goes high and the output of the *and* gate 286 goes low, preventing further down drive movement of the frame 56 and initiating detent action. To this end, the output of the *and* gate 298 is coupled to a drive detent amplifier 300 which actuates the detent solenoids 132. This results in a positive locking of the frame 56 in the proper vertical position in the manner described above.

At the same time that the frame 56 is being lowered to its proper position, the bridge assembly 174 is being positioned in one of twenty positions corresponding to the twenty compartments in the card magazine. The bridge need not be positioned more accurately than one of twenty positions, since any card in a compartment is deflected and guided between the heads by the scanning movement of the carriage when the bridge is positioned in line with the center of a compartment.

The address for positioning the bridge is applied from the register 270 to one group of inputs of a digital comparator circuit 302. Another group of inputs is applied to the digital comparator circuit from the resolver 215. If the address is greater in value than that of the resolver, a high level is produced on an output line 304. If they are equal, a high level is produced on an output line 306. If the address is less than the indication of the resolver, a high level is produced on an output line 308. The output lines 304 and 308 are respectively connected to "drive forward" and "drive backward" amplifiers 310 and 312 for actuating respectively one of two electromagnetic clutches in the drive assembly 172 by which the bridge is positioned in a forward or reverse direction along the guides 182. When the bridge is properly positioned, a high level is produced on the output line 306.

Both the "equal" line 296 of the digital comparator 282 and the "equal" line 306 of the digital comparator 302 are applied to the input of an *and* gate 314. A third input is applied to the *and* gate 314 from the bistable multivibrator 292. Thus as soon as the vertical frame 56 is properly positioned and the bridge assembly 174 is properly positioned, a high level is produced at the output of the *and* gate 314. This high level voltage is applied to the "drive across" amplifier 316 to energize the appropriate electromagnetic clutch in the drive assembly 172 and cause the carriage assembly 188 to scan across the selected card. When the carriage assembly 188 reaches the extreme of its travel, it actuates a limit switch 318. The switch 318 provides a positive pulse to the bistable multivibrator 292, changing it to its other stable state. This puts a low level on the input of the *and* gate 314, thereby interrupting the drive of the carriage assembly 188. At the same time, the bistable multivibrator 292 provides a high level on the input of the "reverse" drive amplifier 320, causing the carriage assembly 188 to return to its "home" position. When it reaches this position, the limit switch 211 is actuated, restoring the bistable multivibrator 292 to its initial position so as to stop the "reverse" drive.

Triggering of the bistable multivibrator 292 by the limit switch 318, in addition to initiating the "reverse" drive, also removes the high level from one of the inputs to the *and* gate 298, thus releasing the detent. At the same time, a high level is provided by the bistable multivibrator 292 to the input of *and* gate 322 together with the high level derived from the bistable multivibrator 294. This actuates the "drive up" amplifier 324, energizing the appropriate electromagnetic clutch to cause the frame 56 to return to its "home" position.

Frame 56 actuates the limit switch 171. This triggers the multivibrator 294 to its other stable state, producing a low level on one input of each of the *and* gates 286, 298, and 322. Any further movement of the frame 56 is thereby prevented until the multivibrator 294 is reset by the operation of the start switch 278.

It will be apparent that the apparatus described is capable of automatically addressing any one of a plurality of tracks on any one of a large number of cards. While a manual start switch 278 is shown, the function of this switch can be controlled automatically from the data processing equipment with which the card memory is used. The arrangement provides fast access to a large amount of stored data.

What is claimed is:

1. A card memory system comprising a plurality of cards, each card having a plurality of parallel magnetic strips for recording binary information bits and having a plurality of slots along the top edge, selected ones of the slots on each card having undercut portions at the bottom of the slot according to a predetermined coded pattern, each card being uniquely identified by the pattern of undercut portions at the bottom of the plurality of slots in the card, retractable means for supporting the cards in a horizontally stacked position with the slots aligned, a plurality of bails extending horizontally through the aligned slots, means responsive to an address signal for selectively moving the bails laterally towards the edges of the slots into engagement with the undercut portions, means for retracting said card supporting means so that the cards are permitted to drop, the bails preventing all but one of the cards from dropping according to the pattern of undercut portions of the slots by engaging at least one of the undercut portions of each of the other cards, a transducer head, means responsive to an address signal for moving the transducer head parallel to, but below, the stack of cards to a selected position, the head being moved simultaneously with the selection and dropping of a card, whereby the head is moved into position to scan any card selected by the bails, means for scanning the head transversely beneath the stack of cards across the face of the selected card dropped out of the stack, means for operating the transducer head to read off and write on new information during the operation of the scanning means, and means responsive to an address signal for controlling the vertical position of the dropped card relative to the transducer head for positioning a selected one of said plurality of magnetic strips in position opposite the transducer head.

2. A card memory system comprising a plurality of cards, each card having information recorded thereon and having a plurality of slots along the top edge, selected ones of the slots on each card having undercut portions at the bottom of the slot according to a predetermined coded pattern, each card being uniquely identified by the pattern of undercut portions at the bottom of the plurality of slots in the card, retractable means for supporting the cards in a horizontally stacked position with the slots aligned, a plurality of bails extending horizontally through the aligned slots, means responsive to an address signal for selectively moving the bails laterally toward the edges of the slots into engagement with the undercut portions, means for retracting said card supporting means so that the cards are permitted to drop, the bails preventing all but one of the cards from dropping according to the pattern of undercut portions of the slots by engaging at least one of the undercut portions of each of the other cards, a transducer head, means responsive to an address signal for moving the transducer head parallel to, but below, the stack of cards to a selected position, the head being moved simultaneously with the selection and dropping of a card, whereby the head is moved into position to scan any card selected by the bails, means for scanning the head transversely beneath the stack of cards across the face of the selected card dropped out of the stack, means for operating the transducer head to read off and write on new information during the operation of the scanning means, and means responsive to an address signal for controlling the vertical position of the dropped card relative to the transducer head for positioning a selected horizontal portion of the card opposite the transducer head.

References Cited in the file of this patent

UNITED STATES PATENTS

| | | |
|---|---|---|
| 2,602,451 | Hofgaard | July 8, 1952 |
| 2,674,728 | Potter | Apr. 6, 1954 |
| 2,918,656 | Nolde et al. | Dec. 22, 1959 |
| 2,922,424 | Scott | Jan. 26, 1960 |